United States Patent
Kim et al.

(10) Patent No.: US 9,153,867 B2
(45) Date of Patent: Oct. 6, 2015

(54) RECONFIGURABLE MULTIBAND ANTENNA

(71) Applicant: Futurewei Technologies, Inc., Plano, TX (US)

(72) Inventors: Daejoung Kim, San Diego, CA (US); Shing Lung Steven Yang, San Diego, CA (US); Wee Kian Toh, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 242 days.

(21) Appl. No.: 13/720,017

(22) Filed: Dec. 19, 2012

(65) Prior Publication Data
US 2014/0168030 A1    Jun. 19, 2014

(51) Int. Cl.
| | |
|---|---|
| H01Q 3/24 | (2006.01) |
| H01Q 9/14 | (2006.01) |
| H04B 1/04 | (2006.01) |
| H04B 1/18 | (2006.01) |
| H01Q 5/364 | (2015.01) |

(52) U.S. Cl.
CPC ............... *H01Q 3/247* (2013.01); *H01Q 5/364* (2013.01); *H01Q 9/145* (2013.01); *H04B 1/0458* (2013.01); *H04B 1/18* (2013.01)

(58) Field of Classification Search
CPC ...... H01Q 3/247; H01Q 5/0055; H01Q 9/145
USPC .......................................... 343/876, 700 MS
See application file for complete search history.

(56) References Cited

U.S. PATENT DOCUMENTS

| | | | |
|---|---|---|---|
| 6,771,223 B1* | 8/2004 | Shoji et al. | 343/702 |
| 7,324,547 B1 | 1/2008 | Alfieri et al. | |
| 7,880,685 B2* | 2/2011 | Norvell et al. | 343/876 |
| 7,999,749 B2* | 8/2011 | Ying | 343/702 |
| 8,000,737 B2* | 8/2011 | Caimi et al. | 455/550.1 |
| 2008/0266192 A1 | 10/2008 | Tuttle | |
| 2010/0246594 A1 | 9/2010 | Klinglesmith et al. | |
| 2010/0279734 A1 | 11/2010 | Karkinen et al. | |

FOREIGN PATENT DOCUMENTS

| | | |
|---|---|---|
| CN | 1744379 A | 3/2006 |
| CN | 101193049 A | 6/2008 |
| CN | 201160282 Y | 12/2008 |
| CN | 101662070 A | 3/2010 |

OTHER PUBLICATIONS

Hallbjorner, P., "Dual Feed Monopole Antenna," IEEE Proceedings, Microwave Antennas Propagation, vol. 150, No. 3, Jun. 2003, pp. 159-163.

(Continued)

*Primary Examiner* — Hoang V Nguyen
(74) *Attorney, Agent, or Firm* — Conley Rose, P.C.; Grant Rodolph

(57) ABSTRACT

A mobile node (MN) comprising an antenna comprising a proximate end, a distal end, and a midpoint, a first feed coupled to the antenna between the proximate end and the midpoint, a second feed coupled to the antenna between the distal end and the midpoint, a first switch configured to toggle between coupling the first feed to a main feed and coupling the second feed to the main feed, and a controller configured to control the toggling of the first switch.

24 Claims, 4 Drawing Sheets

(56) References Cited

OTHER PUBLICATIONS

Mak, A.C.K., et al., "Reconfigurable Multiband Antenna Designs for Wireless Communication Devices," IEEE Transactions on Antennas and Propagation, vol. 55, No. 7, Jul. 2007, pp. 1919-1928.

Chang, K., et al., "Switched Monopole Antenna for DVB-H Operation," IEEE 2010, pp. 121-124.

Foreign Communication From a Counterpart Application, PCT Application No. PCT/CN2013/090718, International Search Report dated Mar. 20, 2014, 6 pages.

Foreign Communication From a Counterpart Application, PCT Application No. PCT/CN2013/090718, Written Opinion dated Mar. 20, 2014, 3 pages.

Partial English Translation and Abstract of Chinese Patent Application No. CN101662070A, Jun. 20, 2014, 3 pages.

Foreign Communication From a Counterpart Application, PCT Application No. PCT/CN2013/089759, International Search Report dated Mar. 27, 2014, 6 pages.

Foreign Communication From a Counterpart Application, PCT Application No. PCT/CN2013/089759, Written Opinion dated Mar. 27, 2014, 4 pages.

* cited by examiner

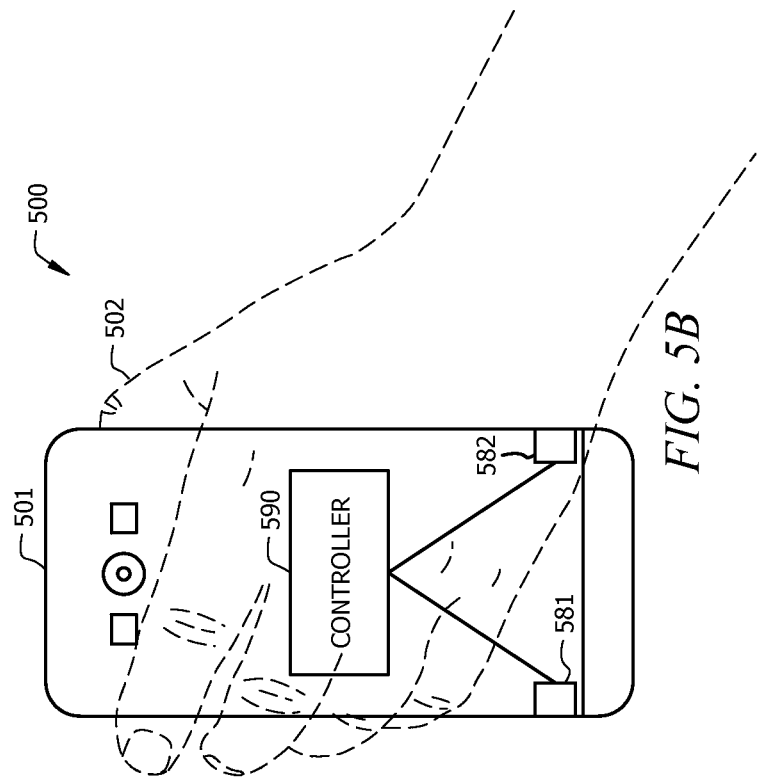
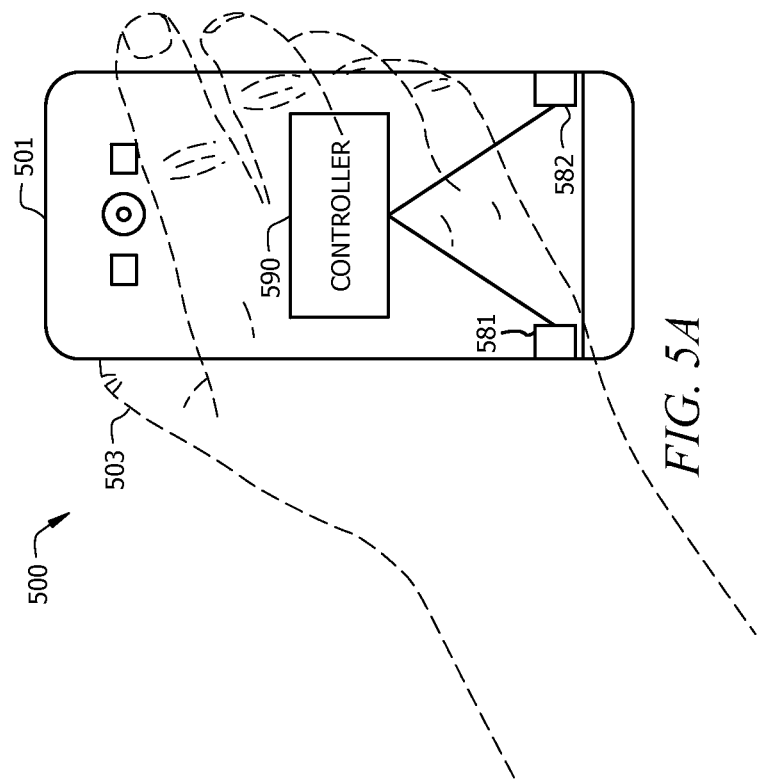

RECONFIGURABLE MULTIBAND ANTENNA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile nodes (MNs) may wirelessly transmit signals to corresponding components via an antenna. Wireless signals may be transmitted in the form of radiant energy, such as radio frequency (RF) energy. Radiant energy transmitted by a MN may be absorbed by a user's body. The amount of radiation absorbed by a user's body when operating a MN is defined as the MN's/antenna's Specific Absorption Rate (SAR). High levels of SAR may be considered unsafe. MNs comprising antennas exhibiting a SAR above certain thresholds may not be sold to the general public.

SUMMARY

In one embodiment, the disclosure includes an apparatus comprising an antenna comprising a proximate end, a distal end, and a midpoint, a first feed coupled to the antenna between the proximate end and the midpoint, a second feed coupled to the antenna between the distal end and the midpoint, and a switch configured to toggle between coupling the first feed to a main feed and coupling the second feed to the main feed, wherein the antenna further comprises a long radiating element and a short radiating element, wherein the long radiating element extends from the first feed to distal end when the first feed is coupled to the main feed, wherein the short radiating element extends from the first feed to proximate end when the first feed is coupled to the main feed, wherein the long radiating element extends from the second feed to proximate end when the second feed is coupled to the main feed, wherein the short radiating element extends from the second feed to distal end when the second feed is coupled to the main feed.

In another embodiment, the disclosure includes a MN comprising an antenna comprising a proximate end, a distal end, and a midpoint, a first feed coupled to the antenna between the proximate end and the midpoint, a second feed coupled to the antenna between the distal end and the midpoint, a first switch configured to toggle between coupling the first feed to a main feed and coupling the second feed to the main feed, and a controller configured to control the toggling of the first switch.

In another embodiment, the disclosure includes a method comprising toggling, by a controller in a MN, a switch from a first position to a second position based on sensor input, wherein the switch is coupled to an antenna via a first feed when in the first position, wherein the switch is coupled to the antenna via a second feed when in the second position, wherein the antenna comprises a first radiation pattern when the switch is in the first position, wherein the antenna comprises a second radiation pattern when the switch is in the second position, and wherein the first radiation pattern is different from the second radiation pattern.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A-5B are schematic diagrams of another embodiment of a reconfigurable multiband antenna control mechanism.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a reconfigurable multiband antenna that may be dynamically altered to reduce SAR measurements based on sensor input. The antenna may comprise a proximate end, a distal end, and a midpoint. The antenna may further comprise a first feed positioned between the proximate end and the midpoint and a second feed positioned between the distal end and the midpoint. The feeds may be coupled to a signal source via a main feed and a switch. The switch may toggle to a first position to couple the antenna to the source via the first feed and toggle to a second position to couple the antenna to the source via the second feed. A radiation pattern resulting from transmissions by the antenna may be different depending on which feed is active. For example, the antenna may be symmetrical with the first feed and the second feed positioned to be equidistant from the midpoint, in which case the radiation pattern when the first feed is active may be an inverted duplication of the radiation pattern when the second feed is active. The switch may be controlled by a controller based on input from at least one MN sensor such as a directional coupler, a capacitive proximity sensor, a gyroscope, an accelerometer, a magnetometer, etc. The controller may receive sensor input from the MN sensor(s) and determine the orientation of the MN at a specified time, whether and how a user is holding the MN at a specified time, and/or power reflected by the antenna at a specified time. The controller may dynamically reconfigure the antenna via the switch based on the sensor input in order to reduce SAR, signal interference, and/or other undesirable antenna transmission characteristics.

Figure 1:
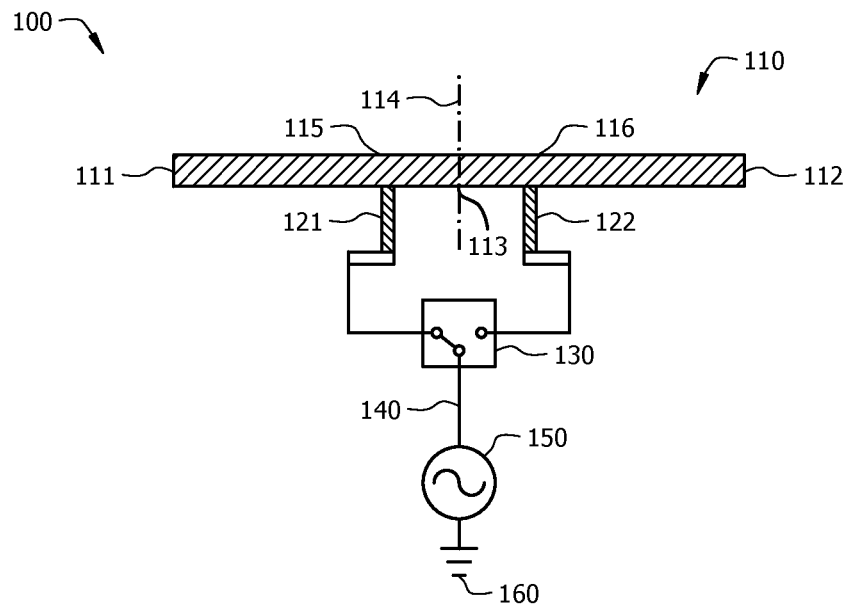
FIG. 1 is a schematic diagram of an embodiment of a reconfigurable multiband antenna.

FIG. 1 is a schematic diagram 100 of an embodiment of a reconfigurable multiband antenna 110. Antenna 110 may be coupled to a signal source 150 via a main feed 140 and a switch 130. The switch 130 may be configured to toggle between coupling to the antenna 110 via a first feed 121 and/or a second feed 122. A feed that is coupled to the antenna 110 at a specified time may be considered an active feed and a feed that is uncoupled from the antenna at a specified time may be considered in inactive feed. The position of a connection between an active feed and the antenna 110 may affect transmission characteristics of the antenna 110, such as radiation patterns, reflected power, SAR, etc. By toggling switch 130 between coupling the first feed 121 to the main feed 140 and coupling the second feed 122 to the main feed 140, the transmission characteristics of antenna 110 may be dynamically reconfigured.

Antenna 110 may be any type of antenna suitable for an MN. For example, antenna 110 may be a monopole antenna. Antenna 110 may comprise a proximate end 111, a distal end 112, and a midpoint 113. The midpoint 113 may be positioned to be equidistant from the proximate end 111 and the distal end 112. Antenna 110 may further comprise a first connection point 115 between the proximate end 111 and the midpoint 113. Antenna may also comprise a second connection point 116 between the distal end 112 and the midpoint 113. The first feed 121 may be connected to the first connection point 115 and the second feed 122 may be connected to the second connection point 116. The positions of the first feed 121 and the second feed 122 and associated connection points 115-116 may be varied based on the desired transmission characteristics for antenna 110. The first feed 121 and the second feed 122 may also be approximately equidistant from the midpoint 113. Antenna 110 may be a monopole antenna with a single feed, as the switch 130 may cause only one feed 121 or 122 to be active at a specified time. In an alternative embodiment, antenna 110 may comprise a plurality of feeds that may be activated as needed to reconfigure the antenna 100 based on desired transmission characteristics.

Antenna 110 may also comprise a central axis 114 that passes through the midpoint 113 and substantially parallel to the first feed 115 and the second feed 116. The antenna 110 may be symmetrical around the central axis 114. The antenna may comprise a long radiating element and a short radiating element. When the first feed 115 is active, the long radiating element may extend from the first feed 115 to the distal end 112 and the short radiating element may extend from the first feed 115 to the proximate end 111. When the second feed 116 is active, the long radiating element may extend from the second feed 116 to the proximate end 111 and the short radiating element may extend from the second feed 116 to the distal end 112. The long radiating element may act as an antenna for signals with a first set of bandwidths and the short radiating element may act as an antenna for signals with a second set of bandwidths. For example, the short radiating element may transmit signals in a first set of bandwidths resulting in a first radiation pattern, while the long radiating element may transmit signals in a second set of bandwidths resulting in a second radiation pattern. By switching the active feed, the antenna 110 may shift the position of the transmission source (e.g. the associated radiating element), for example by causing a signal to transmit from the distal end 112 instead of the proximate end 111, resulting in a different radiation pattern. Presuming the first feed 115 and the second feed 116 are equidistant from the central axis 114, the radiation pattern when the first feed 115 is active may be an inverted duplication (e.g. minor image) of the radiation pattern when the second feed 116 is active.

Schematic diagram 100 may also illustrate a signal source 150, a ground 160, switch 130, and main feed 140. The signal source 150 may be configured to forward signals, such as RF signals, to the antenna 110 for wireless transmission. Signal source 150 may be coupled to the ground 160. Main feed 140 may be coupled to the signal source 150 and the switch 130, and may forward signals from the signal source 150 to the switch 130. Switch 130 may be coupled to the main feed 140, the first feed 121, and the second feed 122. Switch 130 may be configured to occupy a first position to couple the main feed 140 to the first feed 121, as shown in FIG. 1. Switch 130 may also be configured to occupy a second position to couple the main feed 140 to the second feed 121, as discussed with reference to FIG. 2. In an embodiment, switch 130 may be configured to accept additional feeds and toggle through such feeds to produce desired transmission characteristics.

Figure 2:
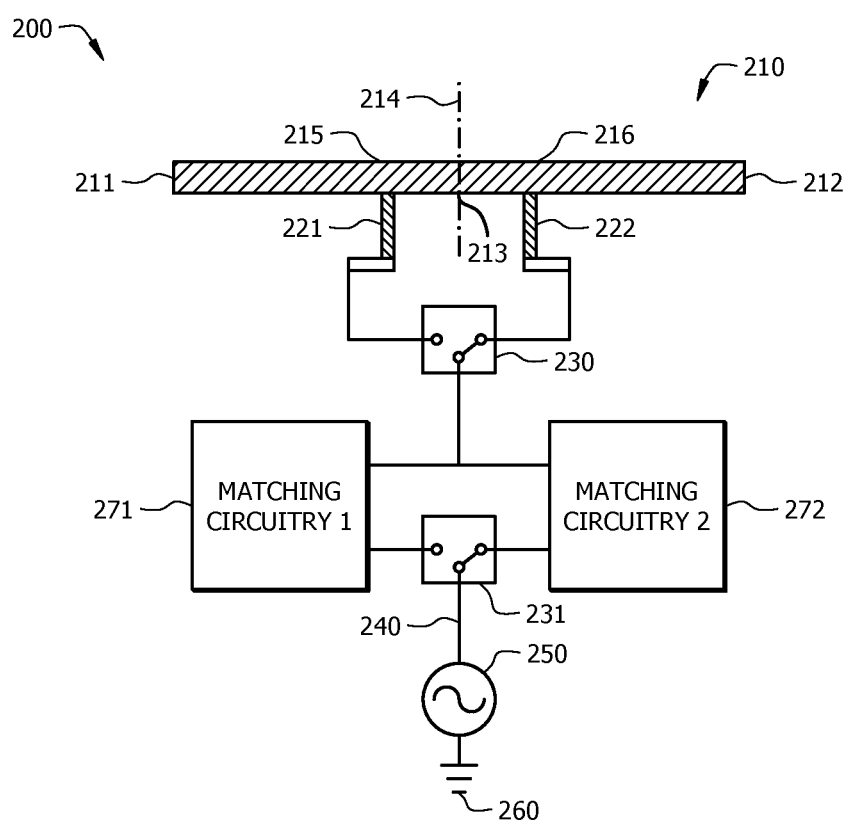
FIG. 2 is a schematic diagram of another embodiment of a reconfigurable multiband antenna.

FIG. 2 is a schematic diagram 200 of another embodiment of a reconfigurable multiband antenna 210. Antenna 210 may comprise a proximate end 211, a distal end 212, a midpoint 213, a central axis 214, a first feed 221, a second feed 222, a signal source 250, a main feed 240, and a ground 260, which may be substantially similar to proximate end 111, distal end 112, midpoint 113, central axis 114, first feed 121, second feed 122, signal source 150, main feed 140, and ground 160 in FIG. 1. Antenna 210 may also comprise a first switch 230, a second switch 231, a first matching circuitry 271, and a second matching circuitry 272. Antennas and feeds may comprise impedance. An antenna may transmit signals with greater efficiency if the impedance of the antenna is substantially similar (e.g. matched) to the impedance of the feed to which the antenna is attached. The first matching circuitry 271 may be configured to match the impedance of the antenna 210 when the first feed 221 is active. The second matching circuitry 272 may be configured to match the impedance of the antenna 210 when the second feed 222 is active. The first switch 230 and second switch 231 may each be substantially similar to switch 130, but may be configured to couple the first feed 221 to the main feed 240 via the first matching circuitry 271 and couple the second feed 222 to the main feed 240 via the second matching circuitry 272. The first switch 230 and second switch 231 are shown in FIG. 2 as occupying the second position, but may be toggled to the first position as discussed in reference to switch 130.

Figure 3:
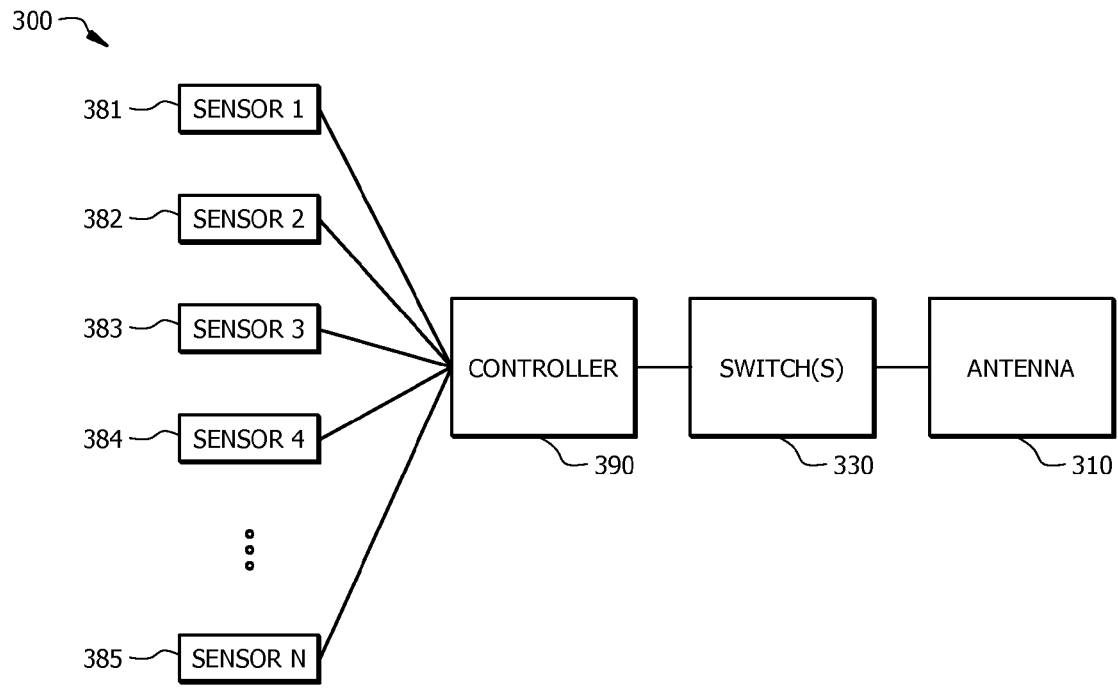
FIG. 3 is a schematic diagram of an embodiment of a reconfigurable multiband antenna control mechanism.

FIG. 3 is a schematic diagram of an embodiment of a reconfigurable multiband antenna control mechanism 300. Control mechanism 300 may comprise least one switch 330 coupled to an antenna 310. Control mechanism 300 may further comprise a controller 390 which may be coupled to the switch 330 and a plurality of sensors 381-385. Antenna 310 may be substantially similar to antennas 110 and/or 210. Switch 330 may be substantially similar to switch 130 and/or switches 230-231 and may be coupled to antenna 310 as shown in FIG. 1 and/or FIG. 2. Controller 390 may be configured to control the toggling of switch 330 based on the sensor input received from sensors 381-385. Sensors 381-385 may be any device or combination of devices that are configured to transmit sensor input and/or similar data to the controller 390 to indicate an operating condition of the MN. The operating condition(s) of the MN may be used by the controller 390 to determine whether and/or when switch 330 should be toggled. Sensors 381-385 may include any number of sensors as needed to support the control of switch 330. For example, the sensors 381-385 may include a directional coupler that measures an operating condition such as antenna power reflection and/or a capacitive sensor that measures an operating condition such as a user's touch as discussed below. Sensors 381-385 may also comprise a magnetometer, an accelerator, and/or a gyroscope that may measure an operating condition such as an orientation of the MN. The controller 390 may use the sensor input indicating the MN operating condition(s) to toggle switch 330 to reconfigure antenna 310.

Figure 4:
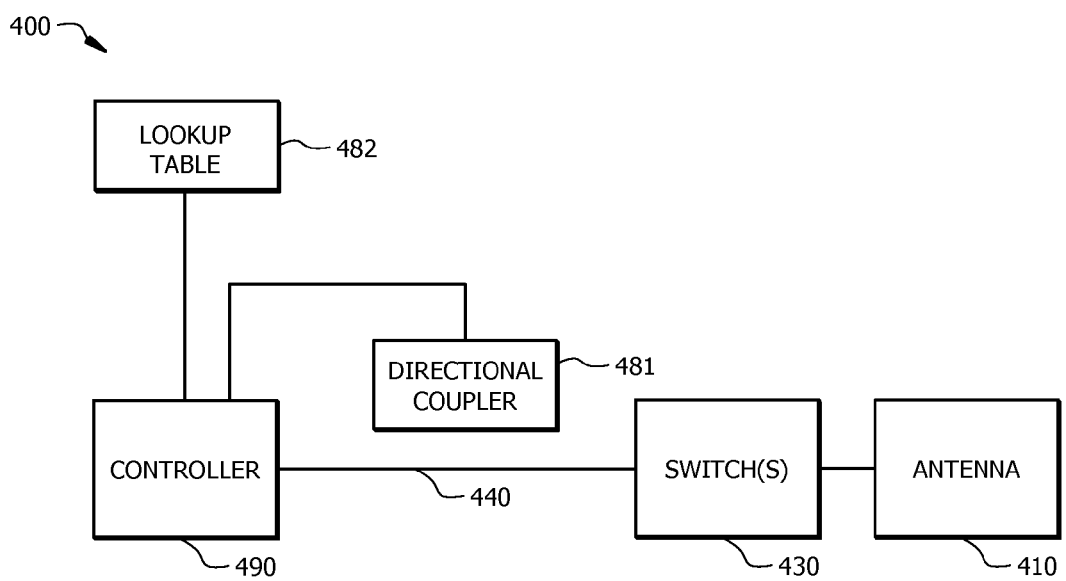
FIG. 4 is a schematic diagram of another embodiment of a reconfigurable multiband antenna control mechanism.

FIG. 4 is a schematic diagram of another embodiment of a reconfigurable multiband antenna control mechanism 400. Control mechanism 400 may comprise at least one switch 430 coupled to an antenna 410, which may be substantially similar to switch 130, switches 230-231, and/or switch 330 and antenna 110, 210, and/or 310, respectively. Control mechanism 400 may further comprise a controller 490 which may be substantially similar to controller 390. Control mechanism 400 may further comprise a directional coupler 481, which may be a specific embodiment of sensors 381-385 and a lookup table 482.

When transmitting a signal, an antenna may 410 reflect some portion of the power associated with the signal back into the feed(s). Increased power reflection may result in energy inefficiency and may indicate an increased SAR. The directional coupler 481 may be configured to monitor power reflection. The directional coupler 481 may be positioned in close proximity to a main feed 440, which may be substantially similar to main feed 140 and/or 240. The directional coupler 481 may measure power reflection over the main feed and may transmit sensor input to the controller 490 indicating the power reflection over the main feed at a specified time.

Lookup table 482 may be implemented on a memory device and may comprise at least one acceptable power reflection threshold value for a specified transmission signal and/or signal type. Controller 490 may obtain a threshold value from the lookup table 482 associated with a signal and compare the threshold value to the power reflection measured by the directional coupler 481. If the power reflection meets and/or exceeds the threshold value, the controller 490 may toggle switch 430 to alter the transmission characteristics of antenna 410. As such, controller 490 may be configured to control the antenna 410 via the switch 430, for example to dynamically increase power efficiency and/or decrease SAR.

FIGS. 5A-5B are schematic diagrams of another embodiment of a reconfigurable multiband antenna control mechanism 500. Control mechanism 500 may be position in an MN 501. MN 501 may comprise a controller 590, which may be substantially similar to controllers 390 and/or 490. MN 500 may further comprise capacitive sensors 581 and 582, which may be specific embodiments of sensors 381-385, and may be coupled to the controller 590. As shown in FIG. 5, MN 501 may comprise a user interface mode (e.g. the MN may be held by a user in the user's right hand 503, left hand 502, or combinations thereof). Capacitive sensors 581 and 582 may be positioned on the MN so that a user's right hand 503 may cover sensor 581 but not 582 and a user's left hand may cover sensor 582 but not 581. Capacitive sensors 581-582 may be configured to register increased capacitance when touched by a user, and may transmit associated sensor input to controller 590. Controller 590 may then use sensor input from the capacitive sensors 581-582 to determine whether the user interface mode is right handed 503 and/or a left handed 502, and may control the toggling of a switch to change the transmission characteristics of a reconfigurable antenna based on the user interface mode, for example to dynamically decrease SAR.

Figure 6:
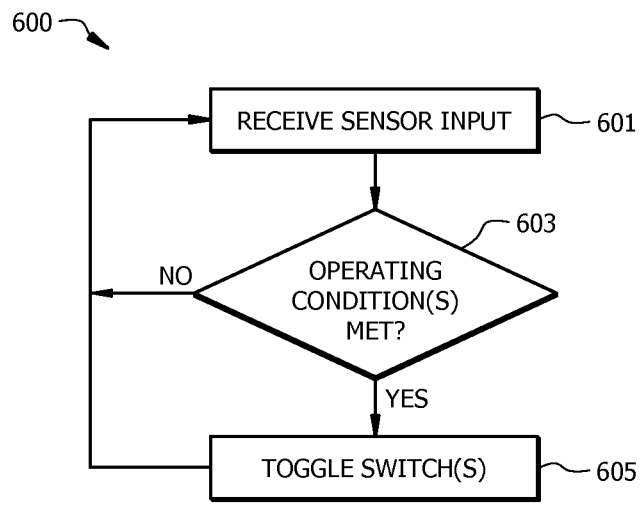
FIG. 6 is a flowchart of an embodiment of a method of controlling a reconfigurable multiband antenna.

FIG. 6 is a flowchart of an embodiment of a method 600 of controlling a reconfigurable multiband antenna. At block 601, method 600 may receive sensor input, for example from sensors 381-385, directional coupler 481, and/or sensors 581-582. The sensor input may indicate the one or more operating conditions in and/or around a MN. At block 603, the method 600 may determine if an operating condition or condition(s) relative to the input has been met. For example, the method 600 may determine if a power reflection threshold value has been exceeded. The method 600 may proceed to block 605 if the relevant operating condition(s) have been met and return to block 601 if the operating condition(s) have not been met. At block 605, the method may toggle a switch, such as switches 130, 230-231, 330, and/or 430, to reconfigure a reconfigurable multiband antenna, such as antenna 110, 210, 310, and/or 410.

Figure 7:
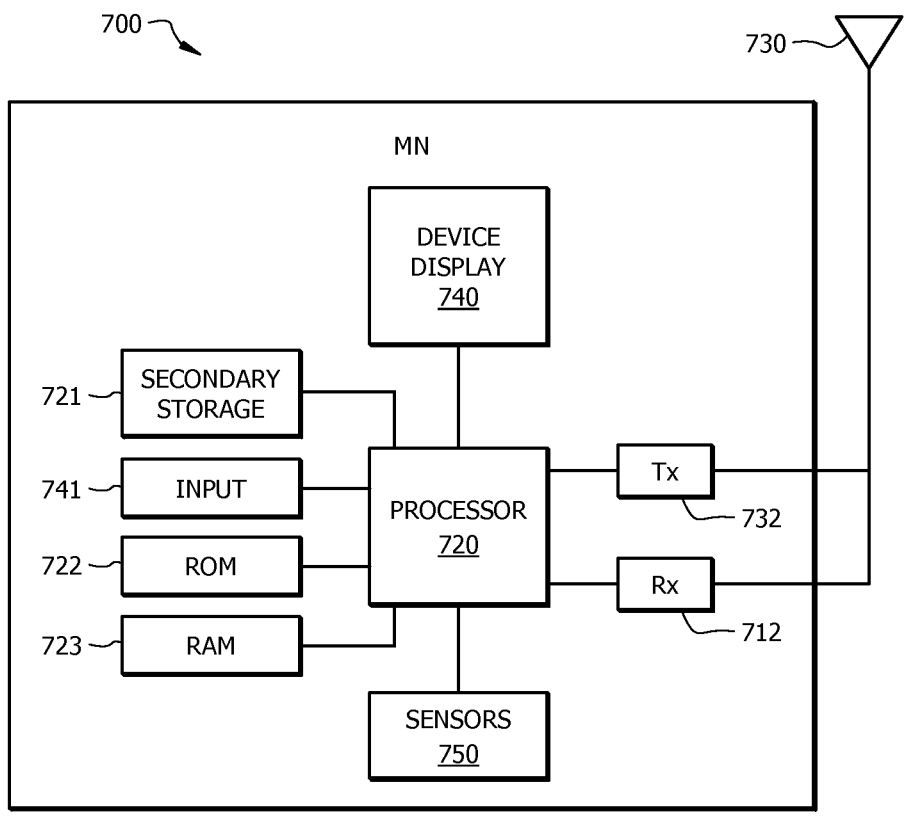
FIG. 7 is a schematic diagram of an embodiment of a MN.

FIG. 7 is a schematic diagram of an embodiment of a MN 700, which may be employed in method 600 and may comprise antenna 110, antenna 210, antenna 310, antenna 410, control mechanism 300, control mechanism 400, and/or control mechanism 500. MN 700 may comprise a two-way wireless communication device having voice and/or data communication capabilities. In some aspects, voice communication capabilities are optional. The MN 700 generally has the capability to communicate with other computer systems on the Internet and/or other networks. Depending on the exact functionality provided, the MN 700 may be referred to as a data messaging device, a tablet computer, a two-way pager, a wireless e-mail device, a cellular telephone with data messaging capabilities, a wireless Internet appliance, a wireless device, a smart phone, a mobile device, or a data communication device, as examples.

MN 700 may comprise a processor 720 (which may be referred to as a central processor unit or CPU) that may be in communication with memory devices including secondary storage 721, read only memory (ROM) 722, and random access memory (RAM) 723. The processor 720 may be implemented as one or more general-purpose CPU chips, one or more cores (e.g., a multi-core processor), or may be part of one or more application specific integrated circuits (ASICs) and/or digital signal processors (DSPs). The processor 720 may be configured to implement any of the schemes described herein, including method 600, and/or control mechanisms 300, 400, and/or 500. The processor 720 may be implemented using hardware, software, firmware, or combinations thereof.

The secondary storage 721 may be comprised of one or more solid state drives and/or disk drives which may be used for non-volatile storage of data and as an over-flow data storage device if RAM 723 is not large enough to hold all working data. Secondary storage 721 may be used to store programs that are loaded into RAM 723 when such programs are selected for execution. The ROM 722 may be used to store instructions and perhaps data that are read during program execution. ROM 722 may be a non-volatile memory device may have a small memory capacity relative to the larger memory capacity of secondary storage 721. The RAM 723 may be used to store volatile data and perhaps to store instructions. Access to both ROM 722 and RAM 723 may be faster than to secondary storage 721. As an example, lookup table 482 may be implemented in ROM 722, RAM 723, and/or secondary storage 721.

MN 700 may be any device that communicates data (e.g., packets) wirelessly with a network. The MN 700 may comprise a receiver (Rx) 712, which may be configured for receiving data, packets, or frames from other components. The receiver 712 may be coupled to the processor 720, which may be configured to process the data and determine to which components the data is to be sent. The MN 700 may also comprise a transmitter (Tx) 732 coupled to the processor 720 and configured for transmitting data, packets, or frames to other components. The receiver 712 and transmitter 732 may be coupled to an antenna 730, which may be configured to receive and transmit wireless (radio) signals. As an example, antenna 730 may comprise and/or be substantially similar to antenna 110, antenna 210, antenna 310, and/or antenna 410. As another example, Tx 732 may comprise and/or be substantially similar to signal sources 150 and/or 250.

The MN 700 may also comprise a device display 740 coupled to the processor 720, for displaying output thereof to a user. The device display 720 may comprise a light-emitting diode (LED) display, a Color Super Twisted Nematic (CSTN) display, a thin film transistor (TFT) display, a thin film diode (TFD) display, an organic LED (OLED) display, an active-matrix OLED display, or any other display screen. The device display 740 may display in color or monochrome and may be equipped with a touch sensor based on resistive and/or capacitive technologies.

The MN 700 may further comprise input devices 741 coupled to the processor 720, which may allow a user to input commands to the MN 700. In the case that the display device 740 comprises a touch sensor, the display device 740 may also be considered an input device 741. In addition to and/or in the alternative, an input device 741 may comprise a mouse, trackball, built-in keyboard, external keyboard, and/or any other device that a user may employ to interact with the MN 700.

The MN 700 may further comprise sensors 750 coupled to the processor 720. Sensors 750 may detect and/or measure conditions in and/or around MN 700 at a specified time and transmit related sensor input and/or data to processor 720. For example, sensors 750 may comprise and/or be substantially similar to sensors 381-385, directional coupler 481, capacitive sensors 581-582, a gyroscope, an accelerometer, a magnetometer, or other sensor device.

It is understood that by programming and/or loading executable instructions onto the MN 700, at least one of the processor 720, the ROM 722, the RAM 723, secondary storage 721, display device 740, sensors 750, transmitter 732, and/or receiver 712 are changed, transforming the MN 700 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means +10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
an antenna comprising a proximate end, a distal end, and a midpoint, wherein the antenna comprises a monopole antenna;
a first feed coupled to the antenna between the proximate end and the midpoint;
a second feed coupled to the antenna between the distal end and the midpoint; and
a switch configured to toggle between coupling the first feed to a main feed and coupling the second feed to the main feed,
wherein the antenna further comprises a long radiating element and a short radiating element,
wherein the long radiating element extends from the first feed to the distal end when the first feed is coupled to the main feed,
wherein the short radiating element extends from the first feed to the proximate end when the first feed is coupled to the main feed,
wherein the long radiating element extends from the second feed to the proximate end when the second feed is coupled to the main feed, and
wherein the short radiating element extends from the second feed to the distal end when the second feed is coupled to the main feed.

2. The apparatus of claim 1, wherein the first feed is coupled to the antenna at a first connection point, wherein the second feed is coupled to the antenna at a second connection point, and wherein the first connection point and the second connection point are equidistant from the midpoint.

3. The apparatus of claim 1, wherein the antenna further comprises a central axis passing through the midpoint and extending substantially parallel to the first feed and the second feed, wherein the antenna is symmetrical around the central axis.

4. The apparatus of claim 1, further comprising a ground coupled to the switch such that the switch is positioned between the antenna and the ground.

5. The apparatus of claim 4, further comprising:
a first matching circuit coupled to the switch and the ground, wherein the first matching circuit is positioned between the switch and the ground; and
a second matching circuit coupled to the switch and the ground, wherein the second matching circuit is positioned between the switch and the ground, and wherein the first matching circuit is positioned in parallel with the second matching circuit.

6. A mobile node (MN) comprising:
an antenna comprising a proximate end, a distal end, and a midpoint;
a first feed coupled to the antenna between the proximate end and the midpoint;
a second feed coupled to the antenna between the distal end and the midpoint;
a first switch configured to toggle between coupling the first feed to a main feed and coupling the second feed to the main feed; and
a controller configured to control the toggling of the first switch,
wherein the distal end of the antenna acts as a monopole antenna when the switch couples the first feed to the main feed, and
wherein the proximate end of the antenna acts as the monopole antenna when the switch couples the second feed to the main feed.

7. The MN of claim 6, wherein the controller is further configured to control the toggling of the first switch when a reflected power from the antenna exceeds a threshold value.

8. The MN of claim 7, wherein the controller is further configured to receive the threshold value from a lookup table.

9. The MN of claim 6, further comprising a ground coupled to the first switch such that the switch is positioned between the antenna and the ground.

10. The MN of claim 9, further comprising:
a first matching circuit coupled to the switch and the ground, wherein the first matching circuit is positioned between the switch and the ground; and
a second matching circuit coupled to the switch and the ground, wherein the second matching circuit is positioned between the switch and the ground, and wherein the first matching circuit is positioned in parallel with the second matching circuit.

11. A mobile node (MN) comprising:
an antenna comprising a proximal end, a distal end, and a midpoint;
a first feed coupled to the antenna between the proximal end and the midpoint;
a second feed coupled to the antenna between the distal end and the midpoint;
a first switch configured to toggle between coupling the first feed to a main feed and coupling the second feed to the main feed;
a controller configured to control the toggling of the first switch;
a first matching circuitry coupled to the first switch;
a second matching circuitry coupled to the first switch; and
a second switch configured to toggle between coupling the first switch to the main feed via the first matching circuitry and coupling the first switch to the main feed via the second matching circuitry, and
wherein the controller is further configured to control the toggling of the second switch.

12. The MN of claim 11, wherein the controller is further configured to control the toggling of the first switch and the second switch such that the first feed is coupled to the main feed only via the first matching circuitry and the second feed is coupled to the main feed only via the second matching circuitry.

13. A mobile node (MN) comprising:
an antenna comprising a proximal end, a distal end, and a midpoint;
a first feed coupled to the antenna between the proximal end and the midpoint;
a second feed coupled to the antenna between the distal end and the midpoint;
a first switch configured to toggle between coupling the first feed to a main feed and coupling the second feed to the main feed;
a controller configured to control the toggling of the first switch,
wherein the controller is further configured to control the toggling of the first switch when a reflected power from the antenna exceeds a threshold value, and
wherein the controller is further configured to receive measurements of reflected power from a directional coupler.

14. A mobile node (MN) comprising:
an antenna comprising a proximate end, a distal end, and a midpoint;

a first feed coupled to the antenna between the proximate end and the midpoint;
a second feed coupled to the antenna between the distal end and the midpoint;
a first switch configured to toggle between coupling the first feed to a main feed and coupling the second feed to the main feed; and
a controller configured to control the toggling of the first switch,
wherein the controller is further configured to control the toggling of the first switch based on data from at least one sensor indicating an orientation of the MN.

15. A mobile node (MN) comprising:
an antenna comprising a proximate end, a distal end, and a midpoint;
a first feed coupled to the antenna between the proximate end and the midpoint;
a second feed coupled to the antenna between the distal end and the midpoint;
a first switch configured to toggle between coupling the first feed to a main feed and coupling the second feed to the main feed; and
a controller configured to control the toggling of the first switch,
wherein the MN is configured to interface with a user's right hand, a user's left hand, or combinations thereof, and
wherein the controller is further configured to control the toggling of the first switch based on data from at least one sensor indicating the interface with the user's right hand or left hand at a specified time.

16. The MN of claim 15, wherein the controller is further configured to control the toggling of the first switch when a reflected power from the antenna exceeds a threshold value.

17. A method comprising:
toggling a switch to cause a mobile node (MN) antenna on a MN to emit a first radiation pattern on a first side of the MN, wherein the MN antenna is not substantially surrounded by dielectric material; and
toggling the switch to cause the MN antenna to emit a second radiation pattern on a second side of the MN,
wherein the first side of the MN is different than the second side of the MN,
wherein the first radiation pattern is different from the second radiation pattern, and
wherein the switch is toggled in response to sensor input indicating at least one operating condition of the MN.

18. The method of claim 17, wherein the operating condition of the MN comprises a level of power reflected by the antenna, and wherein the method further comprises receiving sensor input indicating the level of power reflected by the antenna prior to toggling the switch.

19. The method of claim 18 further comprising receiving a threshold value prior to toggling the switch, wherein the switch is toggled when the reflected power level exceeds the threshold value.

20. The method of claim 17, wherein the MN antenna is a monopole antenna.

21. A method comprising:
toggling a switch to cause a mobile node (MN) antenna to emit a first radiation pattern; and
toggling the switch to cause the MN antenna to emit a second radiation pattern,
wherein the first radiation pattern is different from the second radiation pattern,
wherein the first radiation pattern is an inverted duplication of the second radiation pattern around an axis passing through a midpoint of the MN antenna, and
wherein the switch is toggled in response to sensor input indicating at least one operating condition of the MN antenna.

22. A method comprising:
toggling a switch to cause a mobile node (MN) antenna to emit a first radiation pattern; and
toggling the switch to cause the MN antenna to emit a second radiation pattern,
wherein the first radiation pattern is different from the second radiation pattern,
wherein a MN operating condition comprises a user interface mode,
wherein the method further comprises receiving sensor input indicating the MN user interface mode is right handed prior to toggling the switch, and
wherein the switch is toggled in response to sensor input indicating at least one operating condition of the MN.

23. A method comprising:
toggling a switch to cause a mobile node (MN) antenna to emit a first radiation pattern; and
toggling the switch to cause the MN antenna to emit a second radiation pattern, wherein the first radiation pattern is different from the second radiation pattern, wherein the switch is toggled in response to sensor input indicating at least one operating condition of a MN, wherein the MN operating condition comprises a user interface mode; and
receiving sensor input indicating the MN user interface mode is left handed prior to toggling the switch.

24. A method comprising:
toggling a switch to cause a mobile node (MN) antenna to emit a first radiation pattern; and
toggling the switch to cause the MN antenna to emit a second radiation pattern, wherein the first radiation pattern is different from the second radiation pattern, and wherein the switch is toggled in response to sensor input indicating at least one operating condition of a MN, wherein the MN operating condition comprises an MN orientation; and
receiving sensor input indicating the MN orientation prior to toggling the switch.

* * * * *